United States Patent
Dean

(10) Patent No.: US 8,212,511 B2
(45) Date of Patent: Jul. 3, 2012

(54) METHOD AND APPARATUS FOR LIMITING TORQUE IN AN ELECTRIC DRIVE MOTOR

(75) Inventor: James J. Dean, Minnesota City, MN (US)

(73) Assignee: Kelsey-Hayes Company, Livonia, MI (US)

( * ) Notice: Subject to any disclaimer, the term of this patent is extended or adjusted under 35 U.S.C. 154(b) by 691 days.

(21) Appl. No.: 12/288,711

(22) Filed: Oct. 22, 2008

(65) Prior Publication Data

US 2010/0097732 A1 Apr. 22, 2010

(51) Int. Cl.
*H02P 7/00* (2006.01)

(52) U.S. Cl. ......... 318/432; 318/721; 318/779; 318/799

(58) Field of Classification Search ............. 318/400.22, 318/400.01, 400.07, 400.15, 400.21, 400.32, 318/400.37, 432, 434, 721, 779, 799, 400.23, 318/400.4, 430; 173/176
See application file for complete search history.

(56) References Cited

U.S. PATENT DOCUMENTS

| | | | |
|---|---|---|---|
| 4,648,003 A | | 3/1987 | Braitinger et al. |
| 4,910,446 A | * | 3/1990 | McMurtry et al. ............ 318/560 |
| 5,382,884 A | | 1/1995 | Hussami |
| 5,731,673 A | * | 3/1998 | Gilmore ........................ 318/432 |
| 6,266,591 B1 | * | 7/2001 | Wilson-Jones et al. ......... 701/41 |
| 7,208,909 B2 | | 4/2007 | Simon |
| 7,242,974 B2 | | 7/2007 | Ko |
| 7,268,509 B2 | | 9/2007 | Schmohl |
| 7,301,124 B2 | * | 11/2007 | Kaufman ................. 219/137.71 |
| 7,552,781 B2 | * | 6/2009 | Zhang et al. .................. 173/176 |
| 2008/0304945 A1 | * | 12/2008 | Hlinka .......................... 414/307 |

FOREIGN PATENT DOCUMENTS

| | | |
|---|---|---|
| DE | 3404359 A1 | 8/1985 |
| EP | 1 191 658 A2 | 3/2002 |
| JP | 2005-022974 A | 1/1993 |
| JP | 2007-111708 A | 4/1995 |
| JP | 2008-249031 A | 9/1996 |
| JP | 2007-143351 A | 6/2007 |
| KR | 10-2008-0091514 A | 10/2008 |

OTHER PUBLICATIONS

Toliyat et al., "Handbook of Electric Motors", Marcel Dekker, Inc., undated, pp. 518-520.
"Desensitizing Electric Motor Controls", Pacific Gas and Electric Company, Aug. 2004, pp. 1-13.
The International Search Reported dated Apr. 26, 2010 for PCT International Application No. PCT/US2009/059659, filed Oct. 6, 2009, 3 pages.
The First Examination Report dated Feb. 24, 2012, as received in the corresponding European Patent Application No. 112009002583.8, filed Oct. 6, 2009 (6 pgs.).

\* cited by examiner

*Primary Examiner* — Walter Benson
*Assistant Examiner* — Antony M Paul
(74) *Attorney, Agent, or Firm* — Tarolli, Sundheim, Covell & Tummino LLP

(57) ABSTRACT

A method (100) is provided for controlling torque of an electric motor (12) including the step (106) of supplying drive current to drive the electric motor. The speed of the electric motor is monitored (108) and from the monitored speed, it is determined (110) when the motor has reached a steady state condition. The supply current is turned off (118) if the monitored torque of the electric motor exceeds a predetermined value (114) after the electric motor has reached the steady state condition.

3 Claims, 2 Drawing Sheets

METHOD AND APPARATUS FOR LIMITING TORQUE IN AN ELECTRIC DRIVE MOTOR

FIELD OF THE INVENTION

The present invention is directed to electric motors and is more particularly directed to a method and apparatus for limiting torque in an electric drive motor.

BACKGROUND OF THE INVENTION

Electric motors are often used to drive a work piece. The connection between the output of the motor and the driven work piece may be through drive linkage. The output force of the electric drive motor can be significant. If the work piece should encounter excessive resistance to movement or have its movement stopped by an obstacle, the output force of the drive motor may result in damage to the connection linkage.

SUMMARY OF THE INVENTION

This invention monitors for an excess amount of output torque from an electric drive motor only after the output speed of the electric motor has reached a steady state drive condition, i.e., a steady state drive velocity.

In accordance with one example embodiment of the present invention, a method is provided for controlling torque of an electric motor including the step of supplying drive current to drive the electric motor. The speed of the electric motor is monitored and from the monitored speed, it is determined when the motor has reached a steady state condition. The supply current is turned off if the monitored torque of the electric motor exceeds a predetermined value after the electric motor has reached the steady state condition.

In accordance with another example embodiment of the present invention, an apparatus is provided for controlling torque of an electric motor comprising a drive circuit connect to the motor for supplying drive current to drive the electric motor. A speed sensor is connected to the motor for sensing speed of the electric motor and a torque sensor is connected to the motor for sensing output torque of the electric motor. A motor controller is connected to the motor, to the drive circuit, and to the speed sensor for (1) determining from the sensed speed of the electric motor when the motor has reached a steady state condition, and (2) turning off the drive circuit if the monitored torque of the electric motor exceeds a predetermined value after the electric motor has reached the steady state condition.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION

Figure 1:
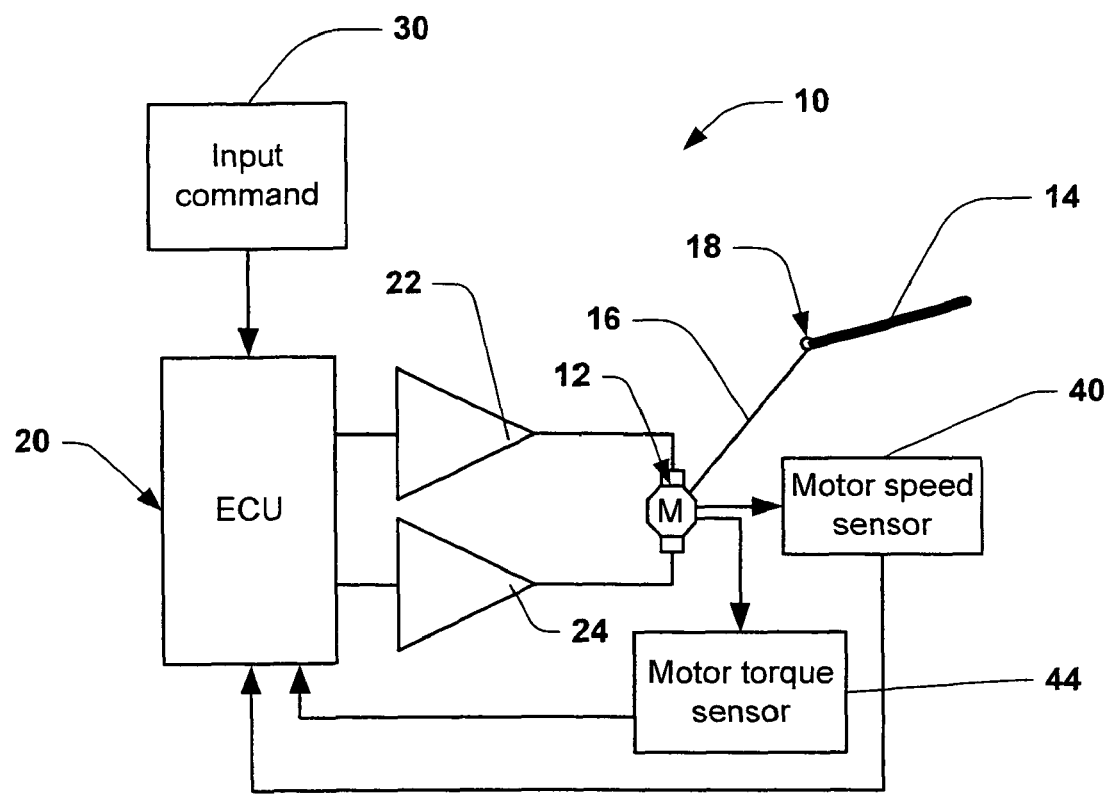
FIG. 1 is a schematic block diagram of a motor drive circuit having a torque limiting motor drive feature in accordance with one example embodiment of the present invention.

Referring to FIG. 1, a motor drive circuit 10, made in accordance with one example embodiment of the present invention, is connected to an electric motor 12. The electric motor is operatively connected to drive a work piece 14 through appropriate connection linkage 16. The linkage 16 is connected to the output shaft (not shown) of the electric motor 12 and to the work piece 14 so that when the output shaft of the electric motor 12 is rotated in one direction, the work piece 14 rotates about a pivot point 18 in a first direction and when the output shaft of the electric motor 12 is rotated in a second direction, the work piece 14 rotates about the pivot point 18 in a second direction.

The motor drive circuit 10 includes an electronic control unit ("ECU") 20 connected to the electric motor 12 through drive circuits 22, 24. An input command interface 30 is connected to the ECU 20 and provides command signals to the ECU to indicate the desired position of the work piece 14. The ECU can be formed using discrete circuitry, an application specific integrated circuit ("ASIC"), or could be a microcomputer. In accordance with one example embodiment of the present invention, the work piece 14 could be a movable damper in a vehicle heating, ventilating, and air conditioning ("HVAC") system. Such systems are also known as climate control systems. The movable damper is used to control air flow in air duct (not shown) of the system. If something were to become lodged in the duct and prevent normal movement of the damper 14, the driving force of the electric motor 12 could result in damage to the linkage 16.

A motor speed sensor 40 is operative connected to the output of the motor 12 for sensing the output speed of the output shaft of the motor and for providing an electrical output signal having a characteristic indicative of the sensed motor speed. The output of the motor speed sensor 40 is connected to an input of the ECU 20 so that the ECU can monitor the motor speed.

Motor speed can be sensed in any of several ways. In accordance with one example embodiment of the present invention, motor speed can be sensed by using an encoder connected to the motor's output shaft that provides a predetermined number of electrical pulses per shaft revolution. By counting the pulses per unit time, motor speed can be determined. In accordance with another example embodiment, a disk can be attached to the end of the motor shaft with a plurality of holes in it with a light source on one side and an optical detector aligned with the light source on the other side of the disk. As the disk turns, pulses will occur in the detector. Pulses per unit time sensed by the optical detector will be an indication of motor speed. Again, those skilled in the art will appreciate other ways of sensing motor speed, any of which may be used with the present invention.

A motor torque sensor 44 is operative connected to the motor 12 for sensing the output torque of the motor and for providing an electrical output signal having a characteristic indicative of the sensed motor torque. The output of the motor torque sensor 44 is connected to an input of the ECU 20 so that the ECU can monitor the motor torque.

Motor torque can be sensed in any of several ways. In accordance with one example embodiment of the present invention, motor torque can be sensed by monitoring the motor current. As monitored motor current increases, the torque increases. In accordance with another example embodiment, increased torque can be determined by monitoring a deceleration of the motor when no motor deceleration has been commanded by the ECU 20. If the motor is decelerating, the motor torque is increasing since an increase load on the work piece 14 must be causing the motor deceleration. Again, those skilled in the art will appreciate other ways of sensing motor torque. For example, a mechanical type torque sensor per se could be coupled between the output shaft of the motor and the work piece 14 of a type that mechanically responds to the increased torque and provides an electrical signal indicative thereof.

Figure 2:
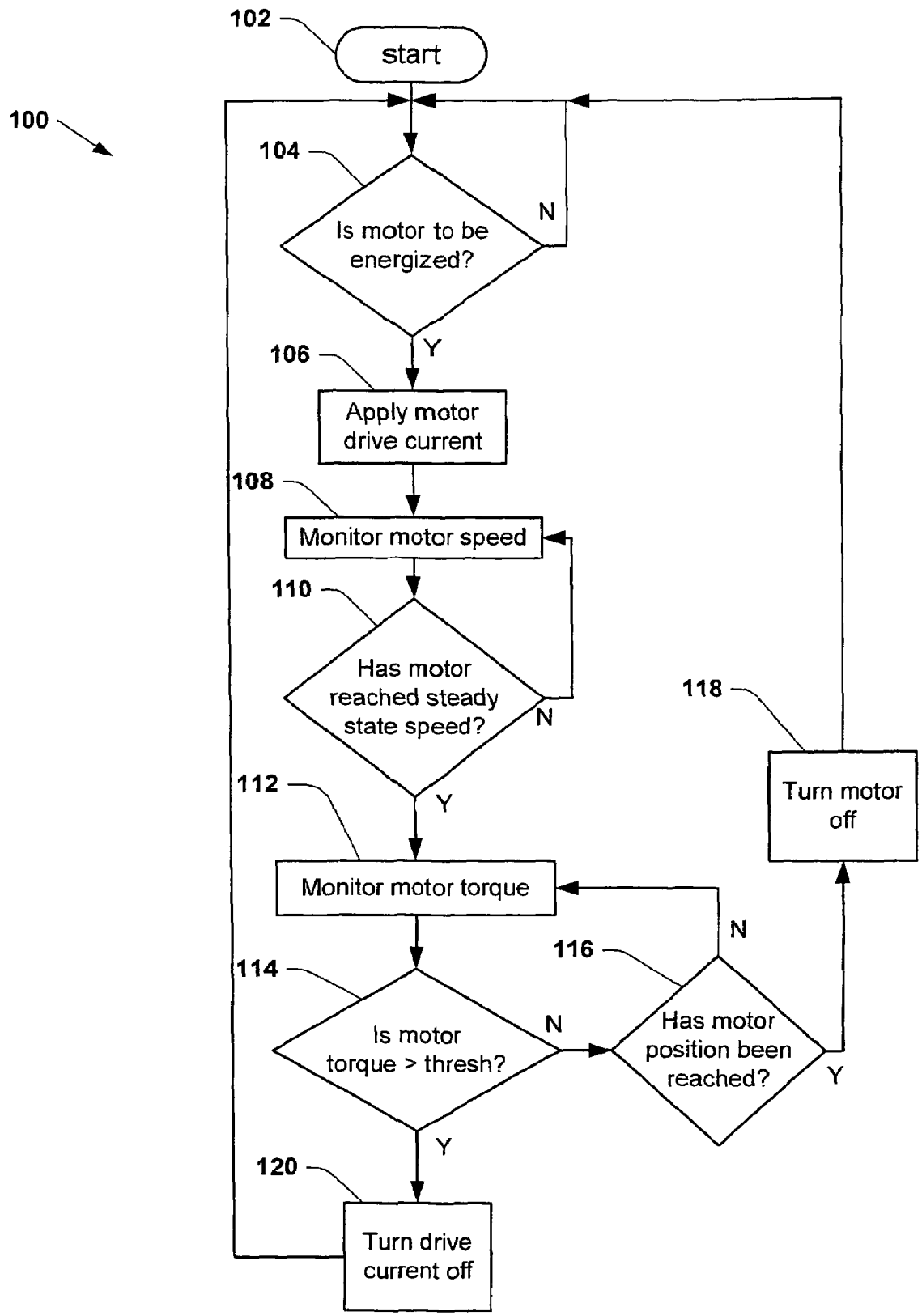
FIG. 2 is a flow diagram of a torque limiting motor control process in accordance with one example embodiment of the present invention.

Referring to FIG. 2, a control process 100 to limit torque in an electric motor in accordance with one example embodiment of the present invention will be appreciated. The process begins at step 102 where memories are cleared and reset, flags are set to initial conditions, etc. At step 104, a determination is made as to whether to motor 12 is to be energized, i.e., has a command been received from the input command 30? If the determination in step 104 is negative, the process loops back upon itself and waits for a command to be received. Once the determination in step 104 is affirmative, the process proceeds to step 106 where motor current is applied to the motor 12 through the drive circuits 22, 24.

When motor drive current is first applied to the motor 12, there is an in-rush of current. One way to detect excessive motor torque being applied by the motor 12 is to monitor for motor current greater than a predetermined value. To prevent a false determination of an excessive torque over-load condition during motor start-up as a result of a normal in-rush current event, in accordance with an example embodiment of the present invention, is to wait until the motor has reached a steady state operating speed before the motor current is monitored. In step 108, motor speed is monitored. In step 110, a determination is made as to whether motor 12 has reached a steady state speed, i.e., has the motor 12 stopped accelerating? If the determination in step 110 is negative, the process loops back to step 108 and continues in the 108, 110 loop until the motor stops accelerating. Once the determination in step 110 is affirmative, the process proceeds to step 112 where motor torque is monitored. As mentioned, the motor torque can be monitored by monitoring the motor current or the motor torque could be monitored in other ways such as by monitoring the deceleration of the motor output or with use of a torque sensor per se.

From step 112, the process proceeds to step 114 where a determination is made as to whether the output torque of the motor 12 has exceeded a predetermined threshold? If torque is being measured by motor current, then torque being greater that a threshold is determined by the current being greater than a threshold. If motor deceleration is being monitored to detect a torque overload, then deceleration greater than a predetermined value when no deceleration has been commanded by the ECU is indicative of a torque overload. If the determination in step 114 is negative, the process proceeds to step 116 where a determination is made as to whether the motor has driven the work piece 14, i.e., the position of the output shaft of the motor, to its desired position. If the determination is negative, the process loops back to step 112 and the motor is continued to be driven. If the determination is affirmative, the process goes to box 118 where the motor is turned off and the process loops back to step 104. If the determination in step 114 is affirmative, then the drive current is turned off in step 120 and the process loops back to step 104.

From the above description of the invention, those skilled in the art will perceive improvements, changes and modifications. Such improvements, changes and modifications within the skill of the art are intended to be covered by the appended claims.

Having described the invention, the following is claimed:

1. A method of controlling torque of an electric motor comprising the steps of:
   (a) supplying drive current to drive the electric motor;
   (b) monitoring speed of the electric motor;
   (c) monitoring torque of the electric motor;
   (d) determining from the monitored speed of the electric motor when the motor has reached a steady state condition; and
   (e) turning off the supply current if the monitored torque of the electric motor exceeds a predetermined value after the electric motor has reached the steady state condition; wherein the step of monitoring torque of the electric motor includes the step of monitoring motor deceleration and wherein the step of turning off the supply current occurs when the monitored motor deceleration after the steady state condition is reached exceeds a predetermined threshold.

2. An apparatus for controlling torque of an electric motor comprising:
   drive circuit connect to the motor for supplying drive current to drive the electric motor;
   speed sensor connected to the motor for sensing speed of the electric motor;
   torque sensor connected to the motor for sensing output torque of the electric motor by monitoring for a deceleration of the electric motor;
   motor controller connected to the motor, to the drive circuit, to the torque sensor, and to the speed sensor for (1) determining from the sensed speed of the electric motor when the motor has reached a steady state condition, and (2) turning off the drive circuit if the monitored torque as indicated by a deceleration of the electric motor exceeds a predetermined value after the electric motor has reached the steady state condition.

3. An apparatus for controlling torque of an electric motor comprising:
   drive circuit connect to the motor for supplying drive current to drive the electric motor;
   speed sensor connected to the motor for sensing speed of the electric motor;
   torque sensor connected to the motor for sensing output torque of the electric motor;
   motor controller connected to the motor, to the drive circuit, and to the seed sensor for (1) determining from the sensed speed of the electric motor when the motor has reached a steady state condition, and (2) turning off the drive circuit if the monitored torque of the electric motor exceeds a predetermined value after the electric motor has reached the steady state condition;
   a movable damper of a vehicle heating, ventilating, and air conditioning system; and
   linkage connecting movable damper to the electric motor such that operation of the electric motor moves said damper.

* * * * *